United States Patent [19]

Garcia

[11] Patent Number: 5,233,440
[45] Date of Patent: Aug. 3, 1993

[54] OPTICAL ENCODING OF IMAGING DATA

[75] Inventor: Joseph P. Garcia, Silver Spring, Md.

[73] Assignee: The United States of America as represented by the Secretary of the Navy, Washington, D.C.

[21] Appl. No.: 553,058

[22] Filed: Jul. 16, 1990

[51] Int. Cl.⁵ .................. H04N 1/40; H04N 1/04
[52] U.S. Cl. .................. 358/448; 358/484; 358/901
[58] Field of Search ........... 358/448, 484, 474, 471, 358/901, 400; 250/227.12

[56] References Cited

U.S. PATENT DOCUMENTS

| 3,887,939 | 6/1975 | Hunt ........................... 358/901 |
| 4,128,759 | 12/1978 | Hunt et al. ................... 358/901 |
| 4,356,395 | 10/1982 | Miller .......................... 250/227.12 |
| 4,689,692 | 8/1987 | Harano et al. ............... 358/484 |
| 5,030,824 | 7/1991 | Babbitt ........................ 250/227.12 |

FOREIGN PATENT DOCUMENTS 52-77513  6/1977  Japan ...................... 358/484

Primary Examiner—Edward L. Coles, Sr.
Assistant Examiner—Thomas D. Lee
Attorney, Agent, or Firm—John D. Lewis; Jacob Shuster

[57] ABSTRACT

Optical imaging data sampled through a sensing array of spaced receiving end faces of optic fiber bundles, is encoded by the different signal delay lengths of the fibers forming the respective bundles. The geometry of such end faces in the array is such as to effect encoding in dependence on the angular orientation and position of sampled segments of the optical data relative to the end faces on which such sampled segments impinge.

9 Claims, 2 Drawing Sheets

OPTICAL ENCODING OF IMAGING DATA

BACKGROUND OF THE INVENTION

This invention relates to the encoding of optical imaging data having general utility in pattern recognition systems and the like.

The use of bundles of optical fibers having optical transmitting paths of different signal delay lengths is generally well known as disclosed for example in U.S. Pat. Nos. 3,887,939, 4,079,246 and 128,759 to Hunt, Misek and Hunt et al., respectively. According to the Hunt patent, the geometry of the optical fiber bundles at the image receiving ends thereof is such as to enable determination of image sharpness by position edge encoding. According to the Misek patent, phase delays induced by optical fiber delay loops are associated with sections of an image of scattered light from a laser beam to obtain a superposition of light intensity from the beam. Superpositioning of signal amplitude of a spatially broad signal by use of multiple optical fiber delay lines in a signal filtering arrangement is disclosed in the Hunt et al. patent to detect such a signal originating from a particular direction.

Contrary to the foregoing purposes associated with the prior art use of optical fibers through which signal transmission paths of different delay lengths is established, it is an important object of the present invention to utilize the delay line technique to encode image information for high speed image and signal processing purposes.

SUMMARY OF THE INVENTION

In accordance with the present invention, the receiving end faces of optical fiber bundles are assembled to expose a sensing array in operative alignment with an imaging system from which optical imaging data impinging on the array is encoded before signal processing. Encoding of the optical data is performed by transmission of segments thereof along the optical paths of the optical fibers within the respective bundles which converge into single optical fiber detectors. The optical fibers of each bundle have different signal delay lengths so as to produce different pulse train patterns of electrical signals when the transmitted optical data segments are converted into electrical signals.

The geometry and arrangement of fibers within the bundles terminated at the array of receiving end faces is such as to encode the impinging image data, in the form of an image outline portion of a picture for example, in accordance with the angular orientation of sampled segments of the picture relative to the end faces. Further, the conversion of such encoded image data into a stream of parallel pulse train waveforms is limited to those sampled data segments having a particular positional relationship to the signal receiving end faces of the optical fiber bundles, such as central alignment.

BRIEF DESCRIPTION OF THE DRAWING FIGURES

Other objects, advantages and novel features of the invention will become apparent from the following detailed description of the invention when considered in conjunction with the accompanying drawing wherein.

DETAILED DESCRIPTION OF THE PREFERRED EMBODIMENT

Figure 1:
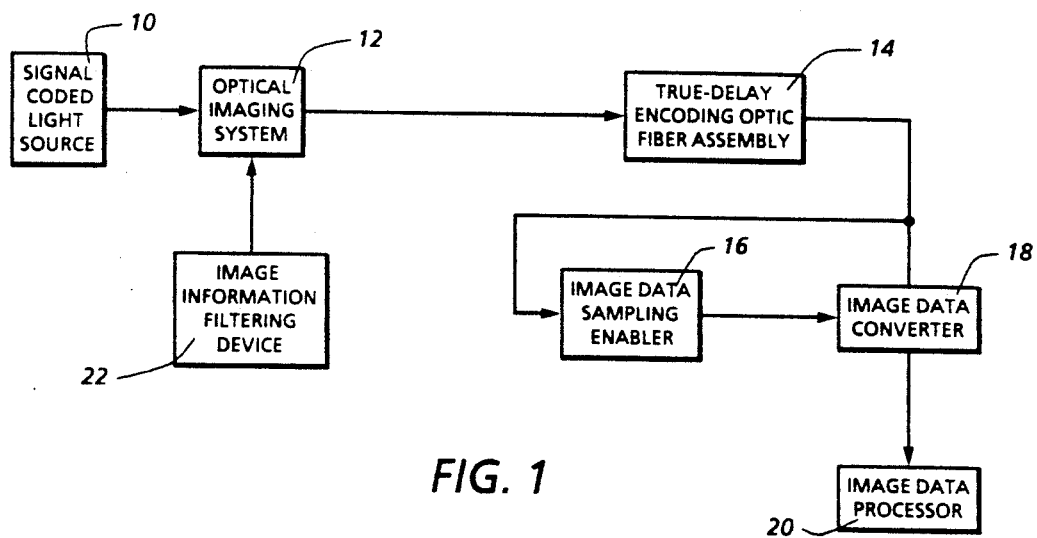
FIG. 1 is a functional block diagram of a signal processing system embodying the present invention.

Referring now to the drawing, FIG. 1 diagrams a signal coded light source 10, such as an ultra short-pulsed laser which emits pulsed light. Such light is fed through an optical lens type of imaging system 12 to a time-delay type of optical fiber assembly 14, within which time delay encoding of the optical data is performed. The output of the fiber assembly 14 is fed to an image data converter 18 utilizing a photodetector through which image data is converted into electrical pulses. Such conversion of the the optical data is limited to preselected samples thereof under control of an enabler 16. The output of converter 18 is fed to data processor 20 for image processing purposes. The processed image obtained through image data processor 20 may be limited to outline portions of the image or picture derived from source 10, by use of a spatial filtering device 22 associated with the system 12, removing low spatial frequency information of the image sampled, which is then encoded through the fiber assembly 14 and converter 18 with edge enhancement in accordance with the present invention.

Figure 2:
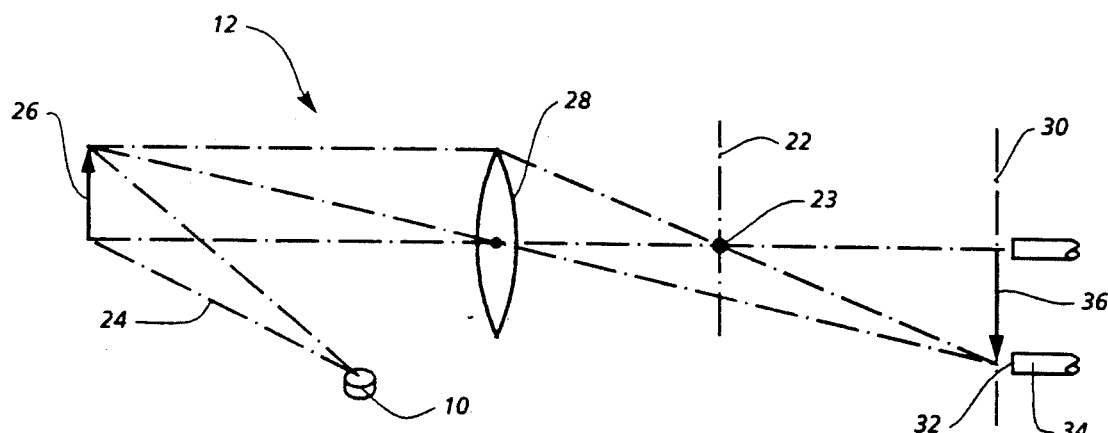
FIGS. 2 and 3 are schematic optical diagrams illustrating an arrangement in accordance with one embodiment of the invention.
Figure 3:
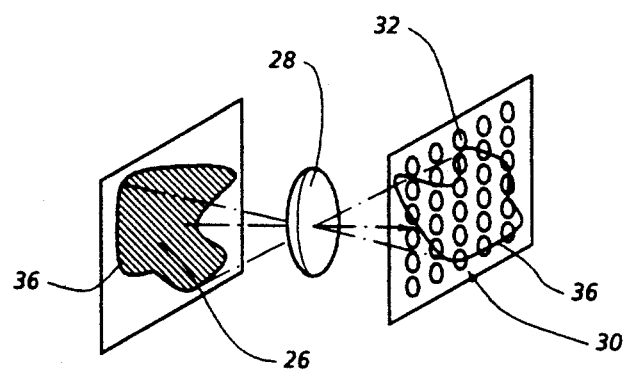

According to one embodiment of the invention as diagrammed in FIG. 2, pulsed light 24 is emitted from source 10 to illuminate an image forming element or picture 26 from which the light is reflected through a lens 28 of the imaging system 12 onto an array 30 of closely spaced receiving end faces 32 of optical fiber bundles 34 in the optical fiber assembly 14. The image data corresponding to the illuminated picture 26 is transmitted by light 24 through lens 28, is restricted by the aforementioned filtering device 22 at a focal point 23 of lens 28 as depicted in FIG. 2 to edge information forming an image outline 36 as depicted in FIGS. 2 and 3. Segments of such image outline projected through lens 28 to form a reverse contrasted image thereof are sampled by impingement of image forming light on some of the end faces 32 of the fiber bundles 34 in the array 30.

Figure 4:
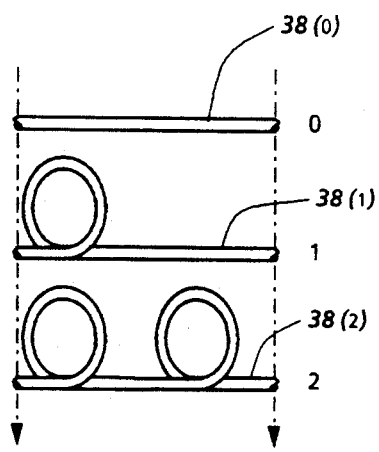
FIG. 4 is a simplified partial plan view of three optical fibers having different signal delay lengths as utilized in one embodiment of the present invention.
Figure 5:
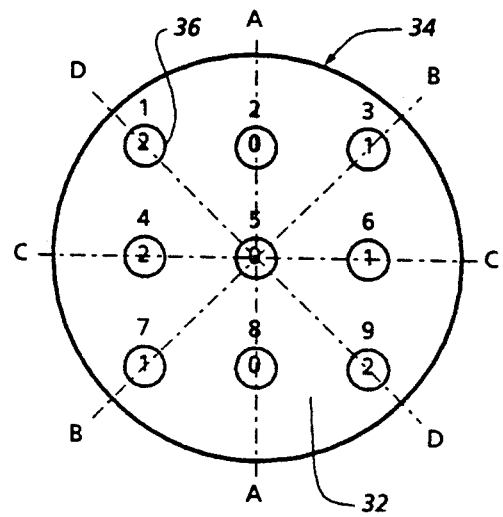
FIG. 5 is an end view showing the geometry of a receiving end face of a optical fiber bundle associated with the optical fiber assembly diagrammed in FIG. 1 and forming part of a sensing array as diagrammed in FIG. 3.
Figure 6:
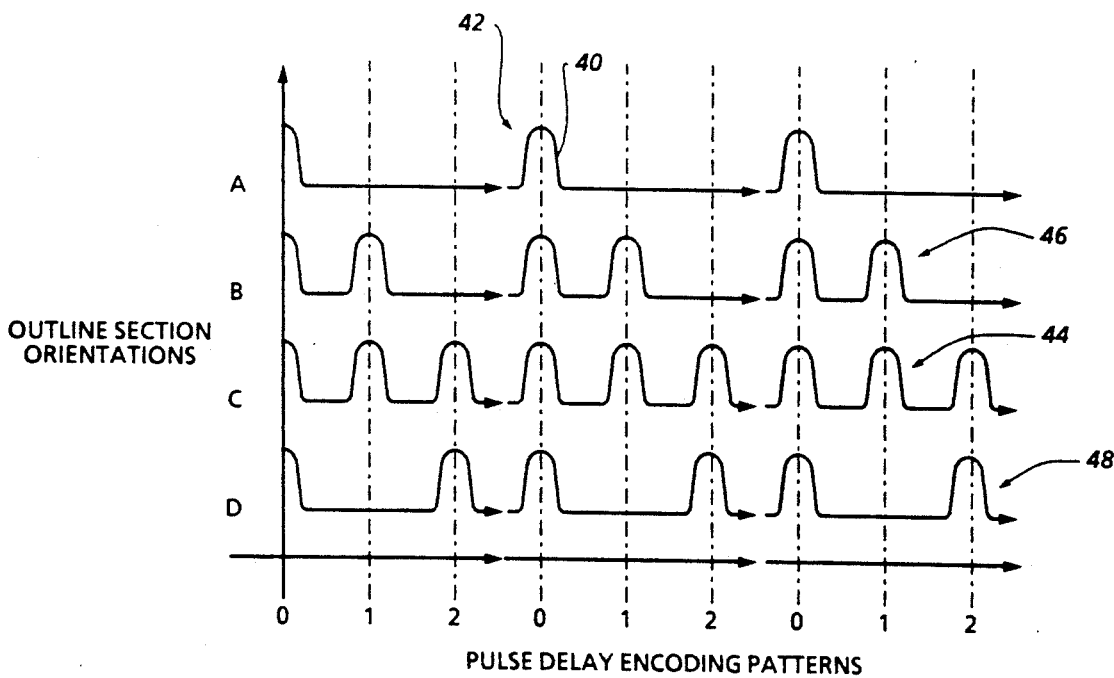
FIG. 6 is a graphical illustration of the the pulse train patterns produced by conversion of the encoded optical imaging data within the system diagrammed in FIG. 1.

FIG. 4 shows by way of example, three of the optic fiber segments 38 (0), 38 (1) and 32 (2) within each bundle 34 having optical transmitting paths of different delay line lengths between equally spaced spatial points. The present invention contemplates the use of a plurality of such optic fiber segments in each bundle 34 with different combinations and arrangements of the different delay line lengths converging into a single optical fiber 38 extending to the converter 18 with the central fiber segments 38 (1) also extending to the enabler 16. By way of example, FIG. 5 shows the end face 32 of such a bundle 34 having nine optical fiber 38 having the three different delay line lengths in a geometrical arrangement for encoding the image signal information received in terms of orientation relative to central positioning of each sampled edge segment of the picture outline 36 diagrammed in FIG. 3. Thus, a vertically orientated line A—A of impinging light centered on the end face 32 of the bundle 34 as shown in FIG. 5 transmits signal delay encoded image data producing through converter 18 a series of equally spaced transmission signal pulses 40 of one type of pulse train 42 as depicted in FIG. 6. On the other hand, a horizontally oriented line C—C of impinging light centered on the end face produces a pulse train 44 formed by more closely spaced pulses 40 as shown in FIG. 6. Still different time delay encoding pulse patterns, as shown in FIG. 6, are respectively associated with the pulse trains 46 and 48 corresponding to the diagonal orientations of the other lines B—B and D—D shown in FIG. 5. Such differently oriented light impingement lines A—A, B—B, C—C and D—D are characterized by their angular relationship to the end faces 32 of the fiber bundles in the array 30. Sampling of image impingement light is limited to central positioning or central alignment thereof on the fiber bundle end faces. The enabler 16 thereby limits conversion of the image data to the pulse trains 42, 44, 46 and 48 of electrical transmission signals for example, corresponding only to the end face centered impingement lines of light according to one embodiment. Thus, if no light falls on the center fiber segment 38 (1) of the bundle 34 at its image receiving end 32, output of the fiber bundle is inhibited.

It is also contemplated that the light source 10 could be in the form of a laser device with optical modulation. In such case, the optical image data represented by a modulated laser beam may be encoded to create a compound signal of various phase delays depending on the orientation and positioning of the optical image section falling on the receiving end face 32 of each fiber bundle 34 as hereinbefore described.

The output of each fiber bundle may be directed onto a photodetector of the converter 18, connected to a digital correlator for example, in order to implement the present invention. Many of such signal processing devices receiving inputs from fiber bundles 34 may operate at a high speed rate in parallel to process an image in accordance with generally well known signal processing techniques, the details of which form no part of the present invention.

Numerous other modifications and variations of the present invention are possible in light of the foregoing teachings. It is therefore to be understood that within the scope of the appended claims the invention may be practiced otherwise than as specifically described.

What is claimed is:

1. In combination with a source of imaging data and time delay means through which optical transmitting paths having signal receiving ends are established, a method of encoding the imaging data, including the steps of: positioning the signal receiving ends of said optical transmitting paths spaced within an array operatively aligned with said source of the imaging data; sampling the imaging data transmitted through said optical transmitting paths extending from the signal receiving ends thereof positioned within the array; and converting the imaging data into patterns in dependence on different angular relationships thereof to the positioned signal receiving ends of the respective optical transmitting paths through which the imaging data is sampled.

2. The method of claim 1 wherein said sampled imaging data are segments of image outlines.

3. The method of claim 1, further including the step of: converting the sampled imaging data into transmission signals having different pulse patterns corresponding to said orientation of the imaging data.

4. In combination with a source of imaging data and time delay means through which optical transmitting paths of different lengths from signal receiving ends thereof are established, a method of encoding the imaging data, including the steps of: positioning the signal receiving ends of said optical transmitting paths in spaced relation within an array operatively aligned with said source of the imaging data; sampling the imaging data through said optical transmitting paths; and encoding the imaging data in dependence on central alignment of the sampled imaging data relative to the signal receivng ends.

5. The method of claim 4 wherein said sampled imaging data are segments of image outlines.

6. In combination with a source of imaging data and time delay means through which optical transmitting paths having recieving ends are established, a method of encoding the imaging data, including the steps of: assembling the receiving ends of said optical transmitting paths spaced within an array operatively aligned with said source of the imaging data; sampling the imaging data transmitted through said optical transmitting paths extending from the receiving ends thereof assembled within the array; and converting the sampled imaging data into signal pulses spaced from each other in patterns dependent on different angular relationships of the imaging data to the receiving ends of the optical transmitting paths.

7. In combination with a source of imaging data and time delay means through which optical transmitting paths of different lengths from receiving ends thereof are established, a method of encoding the imaging data, including the steps of: assembling the signal receiving ends of said optical transmitting paths in spaced relation within an array operatively aligned with said source of the imaging data; sampling the imaging data through said optical transmitting paths for encoding in accordance with the different lengths thereof; converting the sampled imaging data into signal pulses spaced from each other in patterns dependent on orientation of the imaging data to the signal receiving ends of the optical transmitting paths through which the imaging data is encoded; and limiting said conversion of the encoded imaging data to portions thereof that are centrally positioned relative to the signal receiving ends of the optical transmitting paths to establish the orientation dependent patterns.

8. In combination with a plurality of optic fiber bundles respectively formed by fibers with different signal delaying lengths extending from receiving end faces of the respective bundles arranged in a sensing array and optical imaging means operatively aligned with said sensing array for applying optical data to said receiving end faces of the respective bundles, detector means established by said fiber bundles with the receiving end faces thereof in spaced relation to each other for sampling the applied optical data in response to transmission thereof through the fibers of the different lengths and means for encoding the optical data transmitted through the detector means by conversion into transmission signals in time-spaced pulse patterns dependent on different angular relationships between the receiving end faces and the optical data applied thereto by the optical imaging means.

9. In combination with a plurality of optic fiber bundles respectively formed by fibers with different signal delaying lengths extending from receiving end faces of the respective bundles arranged in a sensing array and optical imaging means operatively aligned with said sensing array for applying optical data to said receiving end faces of the respective bundles, detector means established by said fiber bundles with the receiving end faces thereof in spaced relation to each other for sampling and encoding the applied optical data in response to transmission thereof through the fibers of the different lengths, means for conversion of the optical data transmitted through the detector means into transmission signals in time-spaced pulse patterns dependent on different angular relationships between the receiving end faces and the optical data applied thereto by the optical imaging means and means responsive to detection of the applied optical data centrally positioned relative to the receiving end faces for limiting said conversion of the transmitted optical data to the angular relationships established between the centrally positioned optical data and the receiving end faces.

* * * * *